Patented June 24, 1930

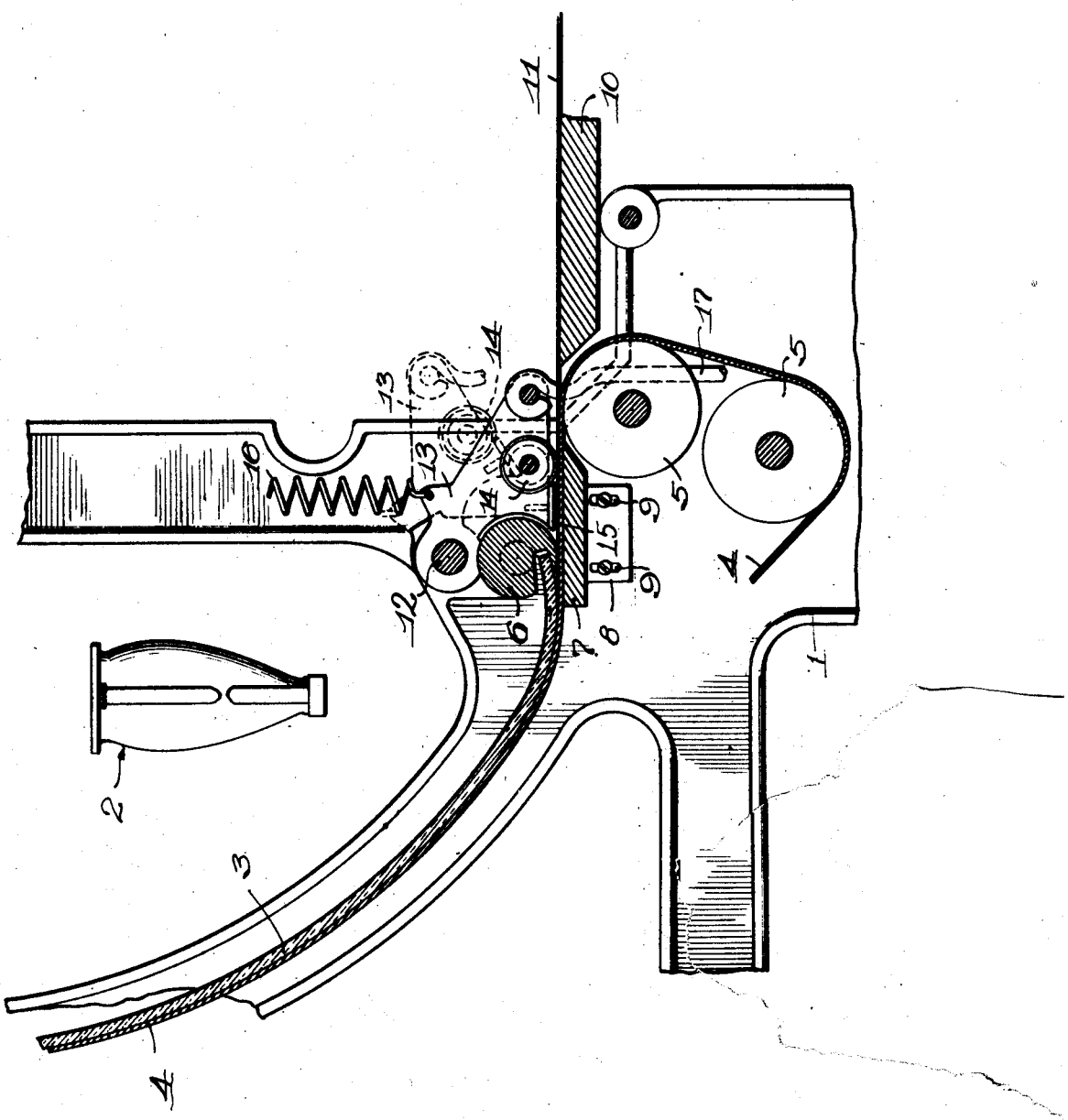

1,767,833

UNITED STATES PATENT OFFICE

HAROLD J. BRUNK, OF CHICAGO, ILLINOIS, ASSIGNOR TO C. F. PEASE COMPANY, A CORPORATION OF DELAWARE

MEANS FOR FEEDING TRACINGS TO BLUE-PRINT MACHINES

Application filed May 23, 1928. Serial No. 279,900.

My invention relates to improvements in means for feeding tracings to blue print machines.

In such machines, and others of like character, for printing on sensitized paper, the latter is drawn over a sheet of glass mounted near a row of arc lights and the negatives are placed on the sensitized paper just before it reaches the rounded support for the forward edge of the glass.

Difficulty has been experienced heretofore in smoothing out the negatives while feeding them forwardly into the machine by hand far enough to enable the belt to hold them by friction and draw them over the glass. This has been particularly true in cases where the negatives were old, wrinkled tracings which otherwise would be drawn into the machine with wrinkles in them, and which in fact are frequently drawn in in this manner and make unsatisfactory prints, despite the effort of the operator to prevent it.

The object of the present invention is to overcome these difficulties by providing a roller, normally spaced above the travelling belt far enough to enable the operator to fully smooth the wrinkles out of the tracing by hand as said belt is passing over a table and before the tracing approaches too near the line where it is drawn between the glass and the belt, said roller being lowered by the operator by foot power, or otherwise, while still holding the tracing under lateral tension, until it rests on said tracing and holds it flat and at the same time assists the belt in feeding into the machine by insuring the necessary friction between the negative and the belt.

In the accompanying drawing I have illustrated one embodiment of the invention in which the essential parts of a blue print machine are disclosed. As stated, the invention is not limited to blue print machines, but has other applications.

The frame of the machine 1 is shown in part and supports a source of arc lights 2 arranged usually in a row and spaced equidistant from a sheet of glass 3, which in this case is curved as shown. A travelling endless belt 4, which may be made of canvas for example, passes around rollers 5, 5 and over an additional driving roller, now shown, whereby said belt is caused to travel upwardly across the outer surface of the glass as shown by the arrow.

The forward edge of the glass is supported in a groove in a rod 6, extending transversely across the machine and supported in the side frames, which rod, in practice, is made of solid brass with a smooth outer surface on the lower part particularly. Immediately below said rod 6, is a steel table 7, which is adjustable vertically by means of side members 8 provided with slots 9, enabling the table to be carefully adjusted so that the belt which passes over said table will maintain accurate and uniform contact with the rod 6.

A wide feeding table 10, is also provided, preferably in the same horizontal plane as the upper surface of the belt 4, where the latter passes over the adjustable table 7. The sensitized paper 11 passes over the two horizontal surfaces referred to and is drawn past the glass by the travelling belt.

Above the transverse rod 6 is mounted a transverse rod 12, serving as a pivotal support for a pair of brackets 13, which rotatably support a roller 14. Said brackets also support a fixed transverse member, shown in the form of an inverted T-bar 15, the lower surface of which serves to deflect the forward edge of the sensitized paper, or the negatives which are placed thereon, when the exposure is to be made. The brackets 13 and a roller 14 carried thereby are normally held in elevated position, as shown in dotted lines, by a suitable spring or springs 16, said roller however, may be lowered into contact with the negatives by stepping on a foot pedal, not shown, attached to the lower end of the rod 17.

When a difficult tracing is to be started into the machine, the operator holds the forward edge of the tracing about one inch from the bar 6, smoothing out the wrinkles with his hands, and while maintaining said tracing under lateral tension, steps on the foot pedal, thus lowering the roller 14 against the tracing and creating sufficient friction between the negative and the sensitized paper to insure drawing the negative forward beneath the rod 6, beyond which point further forward movement is assured. The effect of this roller is also to reduce somewhat the tendency of the tracing to stick to the glass.

Before the development of this feeding attachment, it was impossible for the operator to put the necessary tension on the tracing to take the wrinkles out of it and at the same time push it forward by hand into the machine to the point where the fabric belt would exert enough pulling power to cause the tracing to travel with it. Perfect contact throughout the exposure in cases of this kind are difficult to obtain, because if a satisfactory start is not made at the beginning, slight wrinkles will appear a little farther on during the travel of the tracings over the glass.

My improvement eliminates this difficulty with the exercise of ordinary care on the part of the operator, thereby doing away with the loss caused by prints which have to be destroyed because of inaccuracies caused by wrinkling.

What I claim is:

A machine for making blue prints and the like, comprising a travelling belt for carrying the negatives and prints past the source of light, a transverse member past which said belt moves, carrying said negatives and prints between itself and said transverse member and a roller normally out of engagement with said belt as it approaches said transverse member to permit the operator to smooth the negatives upon the paper in making an exposure and means for moving said roller into engagement with said belt.

In testimony whereof, I have subscribed my name.

HAROLD J. BRUNK.